US012770108B2

(12) United States Patent
Kim

(10) Patent No.: US 12,770,108 B2
(45) Date of Patent: Oct. 20, 2026

(54) APPARATUS FOR MANAGING VEHICLE

(71) Applicant: HYUNDAI MOBIS CO., LTD., Seoul (KR)

(72) Inventor: Jang Ho Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 317 days.

(21) Appl. No.: 18/071,776

(22) Filed: Nov. 30, 2022

(65) Prior Publication Data

US 2024/0078519 A1 Mar. 7, 2024

(30) Foreign Application Priority Data

Sep. 7, 2022 (KR) ........................ 10-2022-0113400

(51) Int. Cl.
*G06Q 10/20* (2023.01)
*G07C 5/00* (2006.01)

(52) U.S. Cl.
CPC ............. *G06Q 10/20* (2013.01); *G07C 5/006* (2013.01)

(58) Field of Classification Search
CPC ........ G06Q 10/20; G07C 5/006; G07C 5/008; H04L 67/12
USPC .......................................................... 705/305
See application file for complete search history.

(56) References Cited

U.S. PATENT DOCUMENTS

2016/0071333 A1* 3/2016 Haidar .................... G07C 5/006 701/29.3
2016/0133063 A1 5/2016 Lim et al.
2017/0263060 A1* 9/2017 Sukumaran .......... G07C 5/0825
2018/0190041 A1 7/2018 Hanson et al.
2019/0228322 A1* 7/2019 Wenner ................ G07C 5/0808

FOREIGN PATENT DOCUMENTS

CN 108469802 A 8/2018
CN 109474671 A * 3/2019 ............. G01N 33/98
CN 110597224 A * 12/2019 ......... G05B 23/0262
CN 112731909 A 4/2021
CN 113902233 A 1/2022
EP 2 603 784 B1 4/2021
KR 10-2009-0049492 A 5/2009
KR 10-2016-0009156 A 1/2016
KR 10-1889049 B1 8/2018
WO WO 2021/045257 A1 3/2021

OTHER PUBLICATIONS

J.-S. Jhou, S.-H. Chen, W.-D. Tsay and M.-C. Lai, "The Implementation of OBD-II Vehicle Diagnosis System Integrated with Cloud Computation Technology," 2013 Second International Conference on Robot, Vision and Signal Processing, Kitakyushu, Japan, 2013, pp. 9-12, doi: 10.1109/RVSP.2013.55. (Year: 2013).*

(Continued)

*Primary Examiner* — Wenren Chen
(74) *Attorney, Agent, or Firm* — NSIP Law

(57) ABSTRACT

An apparatus for managing a vehicle includes a vehicle fault information manager configured to manage information related to a fault of the vehicle, and a vehicle repair information provisioner configured to provide information related to repair the vehicle based on analysis of the information related to the fault of the vehicle.

14 Claims, 5 Drawing Sheets

(56) References Cited

OTHER PUBLICATIONS

L. Li, W. Cui, Z. Sun and J. Wang, "Design and Implementation of the Fault Diagnosis and Health Management System of Special Vehicles," 2020 11th International Conference on Prognostics and System Health Management (PHM-2020 Jinan), Jinan, China, 2020, pp. 51-57, doi: 10.1109/PHM-Jinan48558 (Year: 2020).*

Extended European search report issued on Aug. 22, 2023, in counterpart European Patent Application No. 22211292.2 (8 pages).

European Office Action Issued on Dec. 5, 2024, in Counterpart European Patent Application No. 22 211 292.2 (5 Pages in English).

Korean Office Action Issued on Nov. 11, 2024, in Counterpart Korean Patent Application No. 10-2022-0113400 (5 Pages in Korean).

European Office Action Issued on Jul. 23, 2025, in Counterpart European Patent Application No. 22 211 292.2 (13 Pages in English).

European Brief Communication issued on Dec. 8, 2025, in counterpart European Patent Application No. 22211292.2 (6 pages in English).

Chinese Office Action issues on Apr. 1, 2024 in corresponding Chinese Patent Application No. 202211595017.7 (9 Pages in English, 10 Pages in Chinese).

* cited by examiner

[FIG. 1]
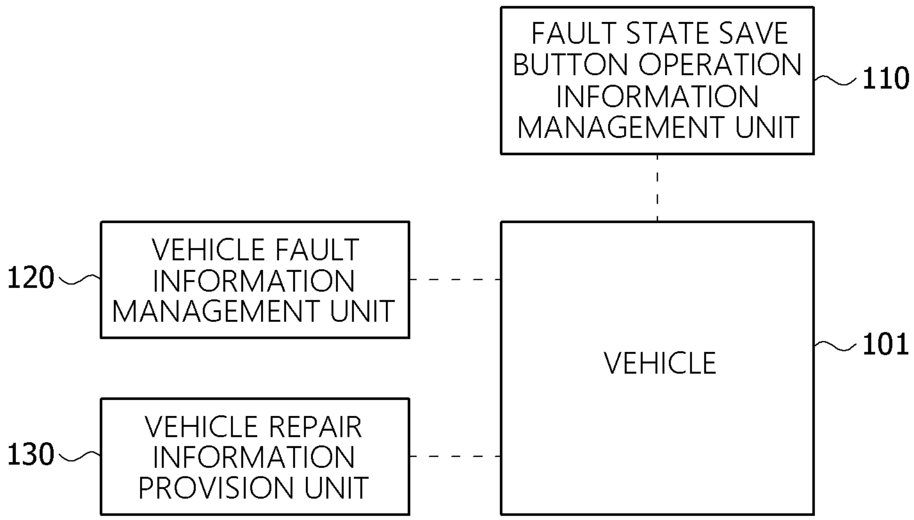

[FIG. 2]
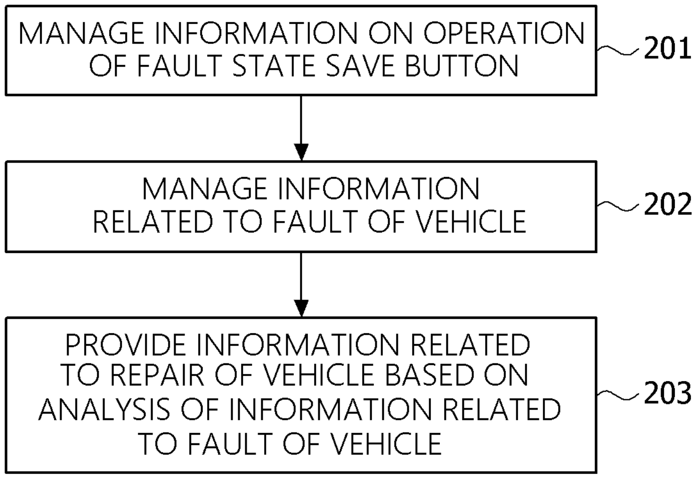

[FIG. 3]
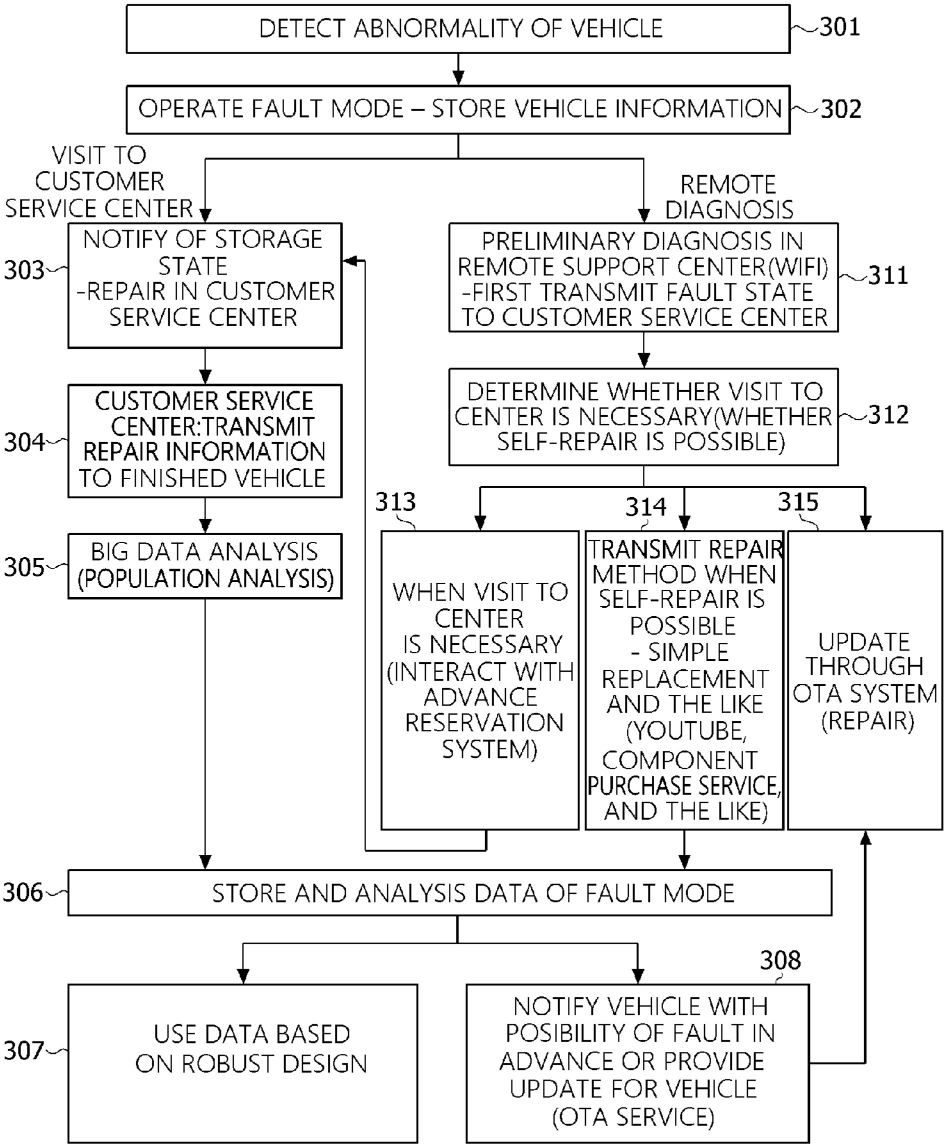

[FIG. 4]
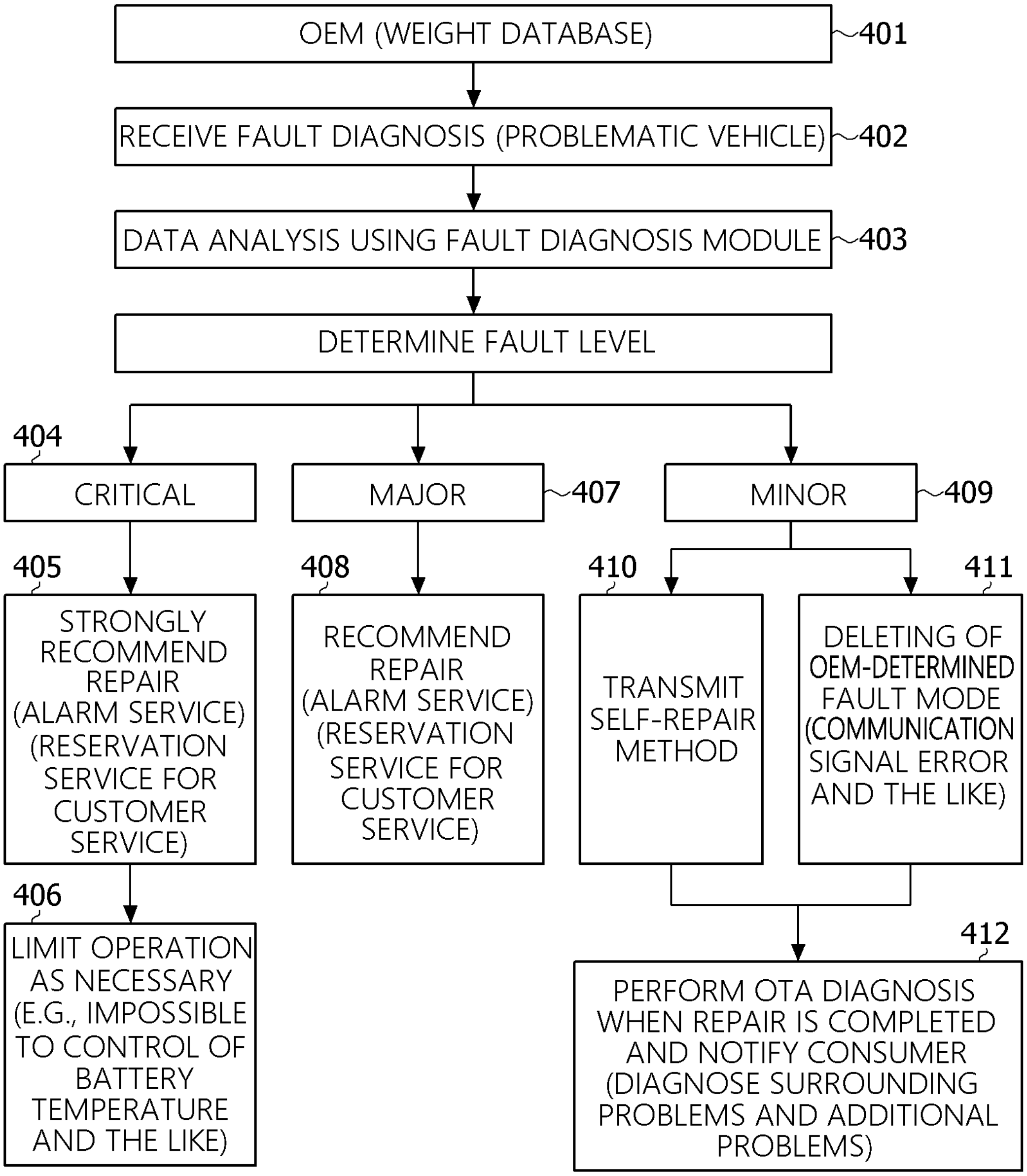

[FIG. 5]
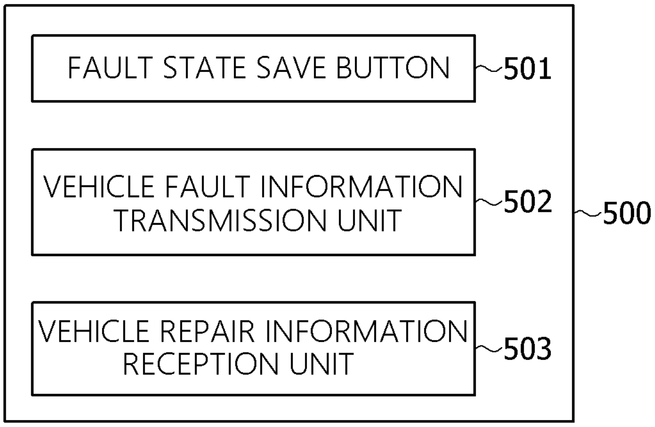

APPARATUS FOR MANAGING VEHICLE

CROSS-REFERENCE TO RELATED APPLICATION

This application claims the benefit under 35 USC 119(a) to of Korean Patent Application No. 10-2022-0113400, filed on Sep. 7, 2022, the entire disclosure of which is incorporated herein by reference for all purposes.

BACKGROUND

1. Field

The following description relates to an apparatus and method for managing a vehicle, and a device mounted on the vehicle, and specifically, to an apparatus for adding a vehicle fault mode for improving customer service.

2. Discussion of Related Art

Vehicles have various problems which occur while traveling, but since they are not easy to reproduce, it is not easy to find faults. In addition, when there is a component which requires replacement during repair, there is also a problem that a driver should visit a center again if there is not the corresponding component in the center.

It is difficult to identify the cause of a component fault, and there are often cases in which unnecessary costs are incurred.

Although many studies are being conducted to solve these problems, there is a problem in that it is difficult to solve these problems with conventional methods.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for managing a vehicle includes a vehicle fault information manager configured to manage information related to a fault of the vehicle, and a vehicle repair information provisioner configured to provide information related to repair the vehicle based on analysis of the information related to the fault of the vehicle.

The apparatus may further include a fault state save button operation information manager configured to manage information on an operation of a fault state save button configured to store a fault state of the vehicle.

When the fault state save button operation manager confirms the operation of the fault state save button of the vehicle, the vehicle fault information manager may be further configured to receive the information related to the fault of the vehicle from the vehicle.

The vehicle repair information provisioner may be further configured to transmit to the vehicle or a user terminal the information related to the repair of the vehicle derived using big data analysis of the information related to the fault of the vehicle.

The vehicle repair information provisioner may be further configured to provide the information related to the repair of the vehicle according to a fault level.

In another general aspect, a device mounted on a vehicle includes a vehicle fault information transmitter configured to transmit information related to a fault of the vehicle to an apparatus for managing the vehicle, and a vehicle repair information receiver configured to receive information related to repair of the vehicle provided based on analysis of the information related to the fault of the vehicle from the apparatus for managing the vehicle.

The device may further include a fault state save button configured to store a fault state of the vehicle.

When the fault state save button is operated, the vehicle fault information transmitter may be further configured to transmit the information related to the fault of the vehicle to the apparatus for managing the vehicle.

The vehicle repair information receiver may be further configured to receive the information related to the repair of the vehicle derived using big data analysis of the information related to the fault of the vehicle.

The vehicle repair information receiver may be further configured to receive the information related to the repair of the vehicle according to a fault level.

In another general aspect, a method of managing a vehicle includes managing information related to a fault of the vehicle, and providing information related to repair of the vehicle based on analysis of the information related to the fault of the vehicle.

The method may further include managing information on an operation of a fault state save button configured to store a fault state of the vehicle.

The managing of the information on the operation of the fault state save button may include confirming the operation of the fault state save button of the vehicle, and the managing of the information related to the fault of the vehicle may include receiving the information related to the fault of the vehicle from the vehicle when the operation of the fault state save button of the vehicle is confirmed.

The providing of the information related to the repair of the vehicle may include transmitting to the vehicle or a user terminal the information related to the repair of the vehicle derived using big data analysis of the information related to the fault of the vehicle.

The providing of the information related to the repair of the vehicle may include providing the information related to the repair of the vehicle according to a fault level.

A non-transitory computer-readable storage medium may store instructions that, when executed by one or more processors, configure the one or more processors to perform any of the methods disclosed.

Other features and aspects will be apparent from the following detailed description, the drawings, and the claims.

BRIEF DESCRIPTION OF THE DRAWINGS

FIG. 1 is a block diagram of an apparatus for managing a vehicle according to an embodiment;

FIG. 2 is a flowchart of a method of managing the vehicle according to an embodiment;

FIG. 3 is a flowchart of the method of managing the vehicle according to an embodiment;

FIG. 4 is a flowchart of remote diagnosis of the method of managing the vehicle according to an embodiment; and FIG. 5 is a block diagram of a device mounted on the vehicle according to an embodiment.

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a block diagram of an apparatus for managing a vehicle according to an embodiment.

According to an embodiment, the apparatus for managing the vehicle may include a fault state save button operation information management unit 110, a vehicle fault information management unit (vehicle fault information manager) 120, and a vehicle repair information provision unit (vehicle repair information provisioner) 130.

The apparatus for managing the vehicle or a component of the apparatus for managing the vehicle may include at least some of a memory, a processor, a data transceiver, and the like. The apparatus for managing the vehicle or the component of the apparatus for managing the vehicle may include at least some of a computing device, a database, a communication device, and the like.

Various information to be described below used by the apparatus for managing the vehicle or the device mounted on the vehicle to be described below may include at least some of all information or data which may be acquired from the vehicle. The various information to be described below used by the apparatus for managing the vehicle or the device mounted on the vehicle to be described below may include at least some of all results, information, or data analyzed based on at least some of all information or data which may be acquired from the vehicle. The various information to be described below used by the apparatus for managing the vehicle or the device mounted on the vehicle to be described below may include at least some of all information or data which may be acquired from another device through communication or transmitted to another device through communication.

According to an embodiment, the fault state save button operation information management unit 110 may manage information on an operation of the fault state save button configured to store a fault state of a vehicle 101.

The vehicle fault information management unit 120 may manage information related to the fault of the vehicle 101.

The vehicle repair information provision unit 130 may provide information related to vehicle repair based on analysis of the information related to the fault of the vehicle 101.

According to an embodiment, in the apparatus for managing the vehicle, when the fault state save button operation information management unit 110 confirms the operation of the fault state save button of the vehicle 101, the vehicle fault information management unit 120 may receive information related to the fault of the vehicle 101 from the vehicle 101.

According to an embodiment, the vehicle repair information provision unit 130 may transmit to the vehicle 101 or a user terminal the information related to the vehicle repair derived using big data analysis of the information related to the fault of the vehicle 101. The user terminal may include a portable device used by a user, a driver, or an occupant who uses the vehicle 101. The user terminal may include a smart phone, a tablet PC, or the like.

According to an embodiment, the vehicle repair information provision unit 130 may provide the information related to the vehicle repair according to a fault level. The vehicle repair information provision unit 130 may transmit to the vehicle 101 or the user terminal the information related to the vehicle repair according to the fault level.

The apparatus for managing the vehicle can efficiently handle faults which occur in the vehicle, develop the vehicle by generating or providing a fault state storage mode which makes it easy to analyze big data, and increase the convenience of consumers who are users.

The apparatus for managing the vehicle can increase user or consumer satisfaction. The apparatus for managing the vehicle may easily identify the fault mode even without the user going to a customer service center to explain everything. The apparatus for managing the vehicle may check the fault by reproducing the stored state of the vehicle.

The apparatus for managing the vehicle may transmit information on the fault mode to a device disposed in a finished vehicle, the customer service center, or the like in advance, thereby securing components in advance, and provide measurements or services so that self-repair for a simple fault is possible.

The apparatus for managing the vehicle may confirm the same quality and cost. The apparatus for managing the vehicle may provide a guide for a similar fault to a mechanic using big data or the like, thereby providing better quality of the repair and decreasing the cost.

The apparatus for managing the vehicle may secure the reliability for a business-to-business (B2B) vehicle fault. The apparatus for managing the vehicle has the advantages that users who use B2B vehicles may easily report faults and quality may be further secured due to good convenience and consistency, and may diagnose faults beforehand using an over-the-air (OTA) service through the fault mode big data analysis.

Since the apparatus for managing the vehicle is advantageous in collecting the big data and thus easily collects the big data of the fault state of the vehicle, it is very easy to find out a time point when a specific fault occurs with a problem which also occurs in other services.

The apparatus for managing the vehicle may easily identify the time point when the vehicle malfunctions using the fault state save button of the vehicle, and also confirm a vehicle state at that time point, thereby providing the user with convenience.

The apparatus for managing the vehicle may provide a future robust design guide through the big data analysis.

FIG. 2 is a flowchart of a method of managing the vehicle according to an embodiment.

According to an embodiment, each operation of the method of managing the vehicle may be performed by at least some of the components of the above-described apparatus for managing the vehicle.

In operation 201, the apparatus for managing the vehicle may manage information on the operation of the fault state save button configured to store the fault state of the vehicle.

In operation 202, the apparatus for managing the vehicle may manage the information related to the fault of the vehicle.

According to an embodiment, the apparatus for managing the vehicle may confirm the operation of the fault state save button of the vehicle, and receive the information related to the fault of the vehicle from the vehicle or the device mounted on the vehicle when the operation of the fault state save button of the vehicle is confirmed.

When the fault state save button of the vehicle is operated, the vehicle or the device mounted on the vehicle may store the state of the fault mode or the information or data related to the fault mode, and additionally store certain specific values other than the real-time storage state. The vehicle or the device mounted on the vehicle may transmit at least some of the stored state, information, data, or the like to the apparatus for managing the vehicle.

The data stored in the vehicle or the device mounted on the vehicle may include data based on the on-board diagnostics (OBD) (e.g. engine/tire pressure, etc.). When the fault state storage mode is operated, all information inside and outside the vehicle together with the OBD data may be stored in real time. Information of sensors, cameras, or LIDAR in the vehicle may be continuously stored, and a microphone installed in the vehicle may be operated so that the sounds inside or outside the vehicle are stored. At this time, the user may also describe and store problems which occur through the microphone. For example, the problem stored by the user may include "Problem A is currently occurring, and frequently occurs in case B" and the like (e.g. A and B may include various cases.).

When the storage of the fault mode of the vehicle or the device mounted on the vehicle is selected, a storage time of the fault mode may be set to a default value of about 10 minutes upon normal operation (e.g. the storage time or the default value changeable by the user). Even when the ignition is turned off, the fault mode may be stored for about 10 minutes. After 10 minutes have elapsed, a notice or notification may be provided to the user through the user terminal or the device mounted on the vehicle (e.g., the storage of the fault mode is terminated upon non-click or non-touch after confirming whether to continuously store the fault mode). When a space in which storage is possible for about 3 to 4 hours is secured, a plurality of various cases may be set to be storable.

The information, data, or factor (INPUT) stored when the storage of the fault mode of the vehicle or the device mounted on the vehicle is selected may include all data (e.g. coolant temperature, engine/battery pressure, accelerator operation time, and the like) which may be collected from the OBD (2), sounds recorded after operations of microphones inside or outside the vehicle (with consumers' consent), information or data acquired from vehicle sensors (e.g. RADAR, LIDAR, ultrasonic sensor, or camera data), information or data collected from CAN/LIN communication (e.g. values for the communication of electronic control units, and component diagnostic data), information for navigation and audio, video, and navigation (AVN) (e.g. vehicle position, or information progressed through the AVN, and the like), information or data acquired from an inertial measurement unit (IMU), and the like.

The vehicle or the device mounted on the vehicle may include a storage medium such as a memory or a storage unit. The storage medium may include a data storage module or DATA STORE MODULE (such as an in-vehicle hard disk or SD card). In the case of the in-vehicle hard disk or SD card, the storage medium is positioned in a cockpit and may be easily attached/attached by a mechanic or a user. The storage medium may be set to be physically attachable/detachable in order to quickly transfer a large amount of data.

The information or data stored in the vehicle and the device mounted on the vehicle may include numerical values or code values, etc. and include encrypted data values for at least some of all information described above in the specification.

In operation 203, the apparatus for managing the vehicle may provide the information related to the vehicle repair based on the analysis of the information related to the fault of the vehicle.

According to an embodiment, the apparatus for managing the vehicle may transmit to the vehicle or the user terminal the information related to the vehicle repair derived using the big data analysis of the information related to the fault of the vehicle.

According to an embodiment, the apparatus for managing the vehicle may provide the information related to the vehicle repair according to the fault level.

FIG. 3 is a flowchart of the method of managing the vehicle according to an embodiment.

In operation 301, the apparatus for managing the vehicle may also receive information on detecting an abnormality of the vehicle from the device mounted on the vehicle. The device mounted on the vehicle may detect the abnormality of the vehicle and transmit related information to the apparatus for managing the vehicle. The device mounted on the vehicle may notify the user of the vehicle or the user terminal of the occurrence of a fault using at least some components of the vehicle (e.g., an output device such as a speaker or a display).

In operation 302, the apparatus for managing the vehicle may receive at least some of all information of the vehicle. When a fault occurs in the vehicle, the device mounted on the vehicle may store all information of the vehicle when the user recognizes the fault (e.g., noise, vibration, abnormal operation, or the like) and presses a button which changes a current mode to the fault state storage mode (when the fault state save button is pressed) and transmit at least some of all the information of the vehicle to the apparatus for managing the vehicle. All the information of the vehicle may include information on engine heat, speed, AVN state, internal and external sounds through the in-vehicle microphone, a song being played, operating components, and the like. The device mounted on the vehicle may primarily store and save related information or data when the operation of the vehicle or the like is terminated or the user terminates the fault state storage mode.

In operation 303, when the user visits the customer service center, the apparatus for managing the vehicle may transmit at least some of the information related to the fault among all the information of the vehicle to the device disposed in the customer service center or the like using position information and the like of the vehicle or the user terminal. The device disposed in the customer service center or the like may include at least some of a computing device and a communication device.

The user may wirelessly transmit the information on the stored fault to a device positioned at a place where the vehicle may be repaired through the device mounted on the vehicle. In addition, the user may go directly to the customer service center or also notify of the corresponding fault state through the user terminal or the like. Accordingly, remote diagnosis is possible and components may be supplied in advance. The device positioned at the place where the vehicle may be repaired may include at least some of the computing device or the communication device.

In operation 304, the apparatus for managing the vehicle may receive the information related to the vehicle repair from the device disposed in the customer service center or the like, the device positioned at the place where the vehicle may be repaired, the user terminal, the device mounted on the vehicle, or the like.

In the customer service center, the vehicle may be repaired based on the corresponding fault mode, and in the customer service center, the repair information or the information related to the vehicle repair may be transmitted to the finished vehicle or the device mounted on the vehicle through the device or the like disposed in the customer service center or the like. The apparatus for managing the vehicle or the device disposed in the customer service center or the like may use or include a database or a management agent such as an oracle enterprise management unit/Oracle Enterprise Manager (OEM).

In operation 305 or operation 306, the apparatus for managing the vehicle may perform the big data analysis or data analysis of the fault mode of the vehicle. The apparatus for managing the vehicle may collect or receive data related to the fault mode of the vehicle from the device disposed in the customer service center or the like or the device mounted on the vehicle, and analyze the received data.

The apparatus for managing the vehicle may notify of or transmit an optimal repair method derived based on the big data analysis to the device disposed in the customer service center, the user terminal, or the like. The apparatus for managing the vehicle may share a component purchase service and a repair method for the simple fault (component replacement) with the user through the user terminal or the like.

In operation 307, the apparatus for managing the vehicle may transmit related data or an analyzed result to a server of a design-related institution and the like for the result analyzed using the big data to be used for the robust design of the vehicle.

In operation 308, the apparatus for managing the vehicle may notify the vehicle or the device mounted on the vehicle in which the fault may occur and may be expected in advance. The apparatus for managing the vehicle may transmit information on fault prediction to the vehicle or the device mounted on the vehicle. Advantageously, the apparatus for managing the vehicle can inform the user of better driving habits through the big data analysis.

In operation 311, the apparatus for managing the vehicle may perform preliminary diagnosis using a system of a remote support center when the user requests the remote diagnosis through the user terminal, the device mounted on the vehicle, or the like. At this time, the data related to the fault state of the vehicle may be first transmitted to the device disposed in the customer service center or the like.

In operation 312, the apparatus for managing the vehicle may analyze the data and determine or decide whether visit to the customer service center is necessary. The apparatus for managing the vehicle may determine or decide whether self-repair is possible. The apparatus for managing the vehicle may transmit to the device mounted on the vehicle, the user terminal, or the like whether the visit to the center is necessary or whether the self-repair is possible.

In operation 313, the apparatus for managing the vehicle may transmit reservation-related information or reservation request information to the device mounted on the vehicle or the user terminal by interacting with an advance reservation system when it is determined that the visit of the vehicle to the customer service center is necessary.

In operation 314, the apparatus for managing the vehicle may transmit a repair method to the device mounted on the vehicle, the user terminal, or the like when it is determined that the self-repair of the vehicle such as simple replacement of vehicle components is possible for the user. The apparatus for managing the vehicle may provide information related to the repair method using a video, such as YouTube, or the component purchase service through the device mounted on the vehicle or the user terminal.

In operation 315, when it is determined that the wireless repair of the vehicle is possible, the apparatus for managing the vehicle may provide updates through the wireless communication, such as OTA, to the device mounted on the vehicle or the corresponding vehicle.

FIG. 4 is a flowchart of remote diagnosis of the method of managing the vehicle according to an embodiment.

In operation 401, the apparatus for managing the vehicle may manage at least some of all information of the vehicle using a database, such as OEM or a weight database, or the like.

In operation 402, the apparatus for managing the vehicle may receive data on the fault diagnosis of the vehicle from a problematic vehicle or a device mounted on the problematic vehicle.

In operation 403, the apparatus for managing the vehicle may perform data analysis for the fault or information of the vehicle using a fault diagnosis module or the like.

In operation 404, operation 407, or operation 409, the apparatus for managing the vehicle may decide or determine the fault level of the vehicle according to the data analysis result.

According to an embodiment, the fault level may include CRITICAL, MAJOR, MINOR, and the like.

According to an embodiment, the fault level may be a first level to an Nth level (N is a natural number which is greater than or equal to 2). The higher the level, the greater the severity of the fault, and the lower the level, the less the severity of the fault. In another example, the reverse is also possible.

In operation 404, the apparatus for managing the vehicle may determine/decide the fault level as CRITICAL.

In operation 405, the apparatus for managing the vehicle may provide an alarm service which strongly recommends the repair of the vehicle through the device mounted on the vehicle or the user terminal when the fault level is determined or decided as CRITICAL. The apparatus for managing the vehicle may provide a reservation service for the customer service through the device mounted on the vehicle or the user terminal.

In operation 406, the apparatus for managing the vehicle may limit the operation of the vehicle as necessary. For example, when a battery temperature of the vehicle is uncontrollable, the apparatus for managing the vehicle may provide a service for limiting the operation of the vehicle through the vehicle or the device mounted on the vehicle.

In operation 407, the apparatus for managing the vehicle may determine or decide the fault level as MAJOR.

In operation 408, the apparatus for managing the vehicle may provide the alarm service for recommending the repair of the vehicle when the fault level is determined or decided as MAJOR. The apparatus for managing the vehicle may provide a service related to the repair of the vehicle through the device mounted on the vehicle, the user terminal, or the like. The apparatus for managing the vehicle may provide the reservation service for the customer service through the device mounted on the vehicle or the user terminal.

In operation 409, the apparatus for managing the vehicle may determine or decide the fault level as MINOR.

In operation 410, when the fault level is determined or decided as MINOR and it is determined or decided that the self-repair is possible, the apparatus for managing the vehicle may provide the service related to a self-repair method through the device mounted on the vehicle, the user terminal, or the like. The apparatus for managing the vehicle may transmit the self-repair method and the like to the device mounted on the vehicle, the user terminal, or the like.

In operation 411, when the fault level is determined or decided as MINOR and determined as being an error such as a communication signal error, the apparatus for managing the vehicle may delete the information related to the fault mode, such as deleting of an OEM-determined fault mode. The apparatus for managing the vehicle may provide a service related to the error through the device mounted on the vehicle, the user terminal, or the like. The apparatus for managing the vehicle may transmit an error resolution method or the like to the device mounted on the vehicle, the user terminal, or the like.

In operation 412, the apparatus for managing the vehicle may perform the OTA diagnosis upon completion of the self-repair (or upon resolution of the error) of the vehicle and provide a consumer notification to the user through the device mounted on the vehicle, the user terminal, or the like. The apparatus for managing the vehicle may provide the diagnosis for surrounding problems or additional problems of the vehicle through the device mounted on the vehicle, the user terminal, or the like.

FIG. 5 is a block diagram of the device mounted on the vehicle according to an embodiment.

According to an embodiment, a device 500 mounted on the vehicle may include a fault state save button 501, a vehicle fault information transmission unit (vehicle fault information transmitter) 502, and a vehicle repair information reception unit (vehicle repair information receiver) 503.

The device 500 mounted on the vehicle or components of the device 500 mounted on the vehicle may include at least some of a vehicle, a controller mounted on the vehicle, a memory, a processor, a data transmitter or receiver, a button, a display, a touch screen, and the like.

The device mounted on the vehicle may provide a method of operating the device mounted on the vehicle performed by at least some of the components of the device mounted on the vehicle. The method of operating the device mounted on the vehicle may include at least some of the operations of the device mounted on the vehicle described in the specification. Each operation of the method of operating the device mounted on the vehicle may include at least some of the operations of the device mounted on the vehicle described in the specification. In addition, the user terminal may perform at least some of all operations of the device mounted on the vehicle.

The fault state save button 501 may include a button mounted on at least a part of the vehicle to store the fault state of the vehicle. The button may be a mechanical type or an electronic type, and may include a button displayed on a display of the vehicle.

The button may be provided as a button for the user who is a consumer to store the fault mode in the cockpit of the vehicle or the like. The button may be disposed on the AVN provided in a general vehicle, a shared vehicle (e.g., a Purpose Built Vehicle (PBV)), or the like. The button may be provided or disposed on the vehicle in a form in which it may be attached to a position desired by the user.

The vehicle fault information transmission unit 502 may transmit the information related to the fault of the vehicle to the apparatus for managing the vehicle.

The vehicle repair information reception unit 503 may receive the information related to the repair of the vehicle provided based on the analysis of the information related to the fault of the vehicle from the apparatus for managing the vehicle.

According to an embodiment, when the fault state save button 501 operates, the vehicle fault information transmission unit 502 may transmit the information related to the fault of the vehicle to the apparatus for managing the vehicle.

According to an embodiment, the vehicle repair information reception unit 503 may receive the information related to the repair of the vehicle derived using the big data analysis of the information related to the fault of the vehicle.

According to an embodiment, the vehicle repair information reception unit 503 may receive the information related to the repair of the vehicle according to the fault level.

The term "unit" used in this embodiment means software or hardware components such as a field-programmable gate array (FPGA) or application-specific integrated circuit (ASIC), and the "unit" performs certain roles. However, the "unit" is not limited to software or hardware. The "unit" may also be configured to reside on an addressable storage medium or may also be configured to reproduce one or more processors. Accordingly, as an example, the "unit" includes components, such as software components, object-oriented software components, class components, and task components, processes, functions, attributes, procedures, subroutines, segments of program codes, drivers, firmware, microcodes, circuits, data, databases, data structures, tables, arrays, and variables. The functions provided in the components and "units" may be coupled by a smaller number of components and "units" or further separated by additional components and "units." In addition, the components and the "units" may also be implemented to reproduce one or more CPUs in a device or security multimedia card.

The fault state save button operation information management unit 110, a vehicle fault information management unit 120, and a vehicle repair information provision unit 130, device 500, fault state save button 501, vehicle fault information transmission unit 502, and vehicle repair information reception unit 503 in FIGS. 1-5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for managing a vehicle, the method comprising:

detecting an operation of a fault state save button provided in the vehicle;

storing fault information of the vehicle in response to the detected operation of the fault state save button; and providing repair information for the vehicle based on an analysis of the stored fault information, wherein, in response to the detected operation of the fault state save button, the method further comprises:

entering a fault state storage mode;

setting a storage time of the fault state storage mode to a predefined storage time;

when the fault state storage mode is operated, storing, in real time, at least on-board diagnostics (OBD) data together with at least one of information or data acquired from vehicle sensors, cameras, or LIDAR, information or data collected from CAN/LIN communication, and sounds recorded by a microphone installed in the vehicle;

continuing the storing for the predefined storage time after the operation of the fault state save button, including continuing the storing for the predefined storage time even when an ignition of the vehicle is turned off; and transmitting at least some of the stored fault information to a vehicle repair information provision unit that analyzes the transmitted fault information to generate the repair information and provides the repair information to the vehicle or a user terminal.

2. The method of claim 1, wherein the predefined storage time is a default value of about 10 minutes, and wherein even when the ignition is turned off, the fault state storage mode is stored for about 10 minutes.

3. The method of claim 1, wherein providing the repair information comprises transmitting the repair information to at least one of a display of the vehicle or a user terminal.

4. The method of claim 1, wherein the repair information is provided based on a severity level of the fault included in the stored fault information.

5. The method of claim 1, further comprising:

storing, in a memory, instructions that, when executed by one or more processors, cause the processors to manage the fault information of the vehicle and to provide the repair information for the vehicle, wherein the instructions further cause the processors to transmit at least some of the stored fault information to a vehicle repair information provision unit.

6. A system for managing a vehicle, comprising:

a fault state save button provided in the vehicle;

one or more processors configured to:

detect an operation of the fault state save button;

store fault information of the vehicle in response to the detected operation; and transmit the stored fault information to a vehicle repair information provision unit, wherein the one or more processors are further configured to:

enter a fault state storage mode in response to the detected operation of the fault state save button;

set a storage time of the fault state storage mode to a predefined storage time;

when the fault state storage mode is operated, store, in real time, at least OBD data together with at least one of information or data acquired from vehicle sensors, cameras, or LIDAR, information or data collected from CAN/LIN communication, and sounds recorded by a microphone installed in the vehicle;

continue the storing for the predefined storage time after the detected operation of the fault state save button, including continuing the storing for the predefined storage time even when an ignition of the vehicle is turned off; and wherein the vehicle repair information provision unit implemented by computing hardware is configured to analyze at least some of the transmitted stored fault information to generate vehicle-specific repair information and provide the generated repair information to the vehicle or a user terminal.

7. The system of claim 6,
wherein the one or more processors are further configured to transmit the stored information to the vehicle repair information provision unit via a communication interface.

8. The system of claim 7,
wherein the vehicle repair information provision unit implemented by computing hardware is configured to analyze the fault information using accumulated vehicle diagnostic data.

9. The system of claim 6,
wherein the vehicle repair information provision unit implemented by computing hardware is configured to determine the repair information according to a fault severity level.

10. A non-transitory computer-readable medium storing instructions that, when executed by a vehicle control unit implemented by at least one processor, cause the vehicle control unit to perform operations comprising:
detecting an operation of a fault state save button provided in the vehicle;
storing vehicle fault information in response to the detected operation;
transmitting the stored vehicle fault information to a vehicle repair information provision unit; and
receiving repair information for the vehicle generated based on an analysis of the transmitted fault information,
wherein the operations further comprise, in response to the detected operation of the fault state save button:
entering a fault state storage mode;
setting a storage time of the fault state storage mode to a predefined storage time;
when the fault state storage mode is operated, storing, in real time, at least OBD data together with at least one of (i) information or data acquired from vehicle sensors, cameras, or LIDAR, (ii) information or data collected from CAN/LIN communication, and (iii) sounds recorded by a microphone installed in the vehicle; and
continuing the storing for the predefined storage time after the detected operation of the fault state save button, including continuing the storing for the predefined storage time even when an ignition of the vehicle is turned off.

11. The non-transitory computer-readable medium of claim 10,
wherein the instructions further cause the at least one processor to detect user interaction with the fault state save button to trigger the storing of the vehicle fault information, and
wherein detecting the user interaction causes the vehicle control unit to enter a fault state storage mode and to set a storage time of the fault state storage mode to a predefined storage time.

12. The non-transitory computer-readable medium of claim 11,
wherein the instructions further cause the at least one processor to confirm the operation of the fault state save button, and
wherein the storing of the vehicle fault information includes receiving internal fault state data from a vehicle system, and
further includes storing at least one of (i) on-board diagnostics (OBD) data, (ii) information or data collected from CAN/LIN communication, and (iii) sounds recorded by a microphone installed in the vehicle.

13. The non-transitory computer-readable medium of claim 12,
wherein the instructions further cause the at least one processor to transmit the fault information to an external server, and
wherein the repair information is generated using big data analysis of fault information collected from multiple vehicles,
wherein transmitting the fault information comprises transmitting at least some of the stored vehicle fault information.

14. The non-transitory computer-readable medium of claim 10,
wherein the repair information is selected based on a fault severity level determined from the analysis of the fault information.

* * * * *